Aug. 4, 1931. W. KUCZORRA 1,817,828
ADVERTISING APPARATUS
Filed May 29, 1930  2 Sheets-Sheet 2
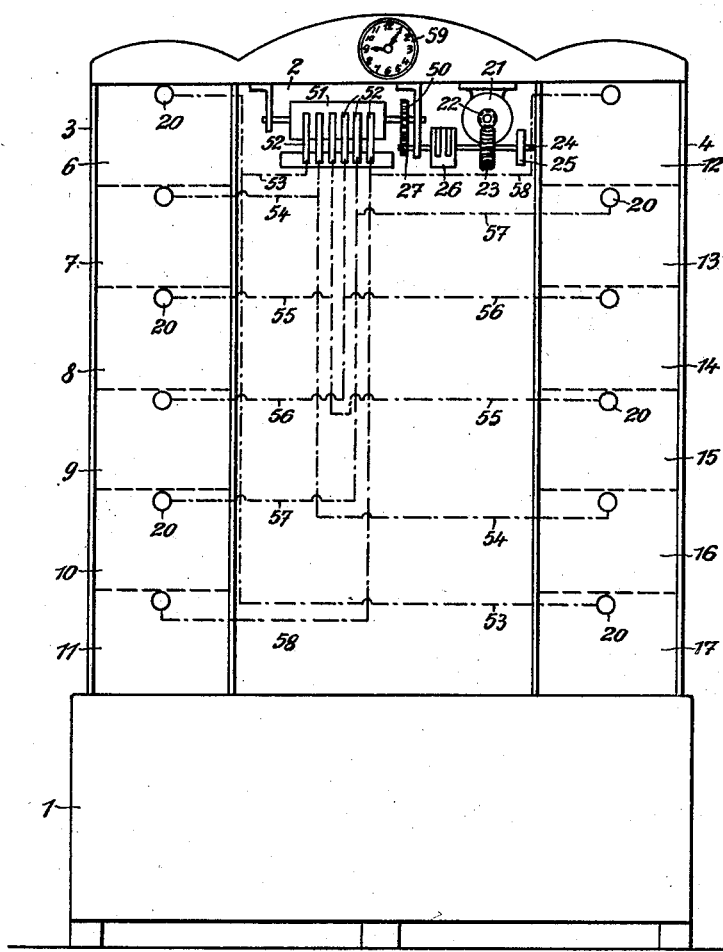
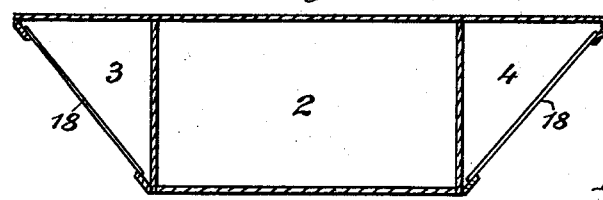

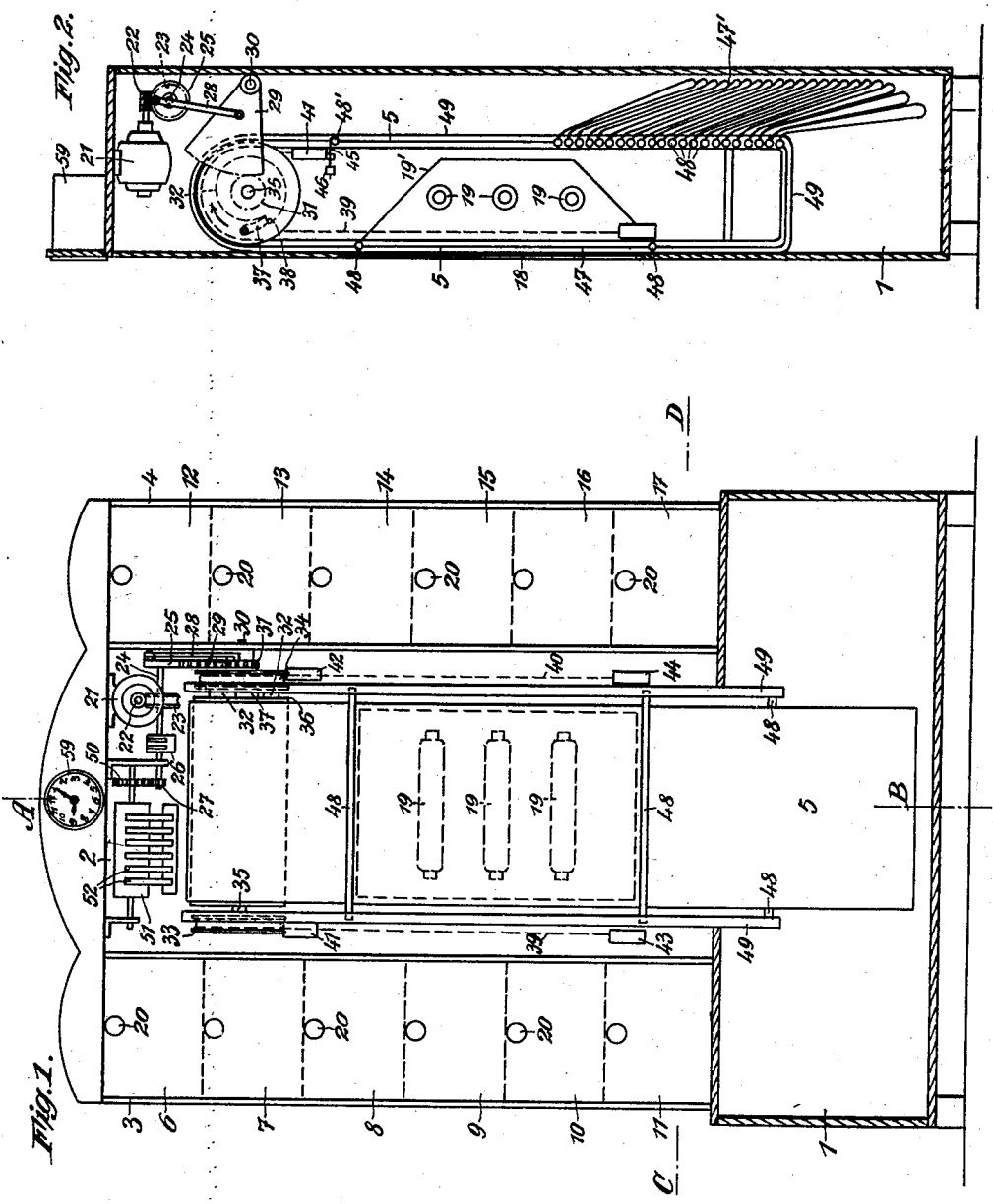

Patented Aug. 4, 1931

1,817,828

UNITED STATES PATENT OFFICE

WILHELM KUCZORRA, OF BERLIN, GERMANY

ADVERTISING APPARATUS

Application filed May 29, 1930, Serial No. 457,297, and in Germany February 1, 1928.

This invention relates to an advertising apparatus, in which the advertisements or (and) pictures or (and) other representations, also articles of suitable kind and size, are arranged behind panes of glass which appear as mirrors as long as they are not illuminated from behind, but become transparent when a source of light provided behind them is rendered active. The chief characteristic features of the invention are these that an intermittently moved band bearing the advertisements etc. is combined with stationary spaces or chambers which are open at the front and in which articles to be exhibited are housed, and that said band is, and said spaces or chambers are, illuminated periodically and alternately by lamps suitably arranged partly behind the said band and partly in the said spaces or chambers, the lamps being switched on in this way that the band is illuminated between the successive illuminations of one, two or more spaces or chambers or one, two or more groups of such ones. It is suited to the purpose in view to establish a certain relation between the advertisements etc. on the band and the articles shown in the chambers, for instance in this way that the advertisements point to the articles next to be illuminated.

The thus designed advertising apparatus is distinguished by its extraordinarily great effectiveness; it excells in this important respect by far certain known advertising apparatus, in which a plurality of show-cases forms two or more paternoster works arranged side by side and moved intermittently behind a pane of glass which appears as a mirror when it is not illuminated from behind and is transparent when it is illuminated from behind, the articles contained in the show-cases being then also illuminated and becoming visible. These and similar advertising apparatus are not only by far more expensive than the present improved apparatus, but their advertising effect is by far below that of this improved apparatus. One of the reasons therefor is, for instance, this that the articles housed in the show-cases of said older apparatus can easily fall or tumble down when such an apparatus is, or its show-cases are, carried about, whereby the effect sought to be attained is destroyed, whereas this can never occur with the present improved apparatus in which the spaces or chambers containing the articles to be shown are stationary. Furthermore, these spaces or chambers can be considerably larger than with paternoster works without any increase of the exterior dimensions, or the bulk, of the complete apparatus.

The invention is illustrated diagrammatically and by way of example on the accompanying drawings in which Figure 1 is a front view of the interior of an advertising apparatus designed according to this invention, the panes of glass, or the transparent mirrors, being omitted in order to show the interior; Figure 2 is a vertical section through the apparatus in the plane A—B of Fig. 1; Figure 3 is a front view of the device; the advertising band and the driving mechanism therefor, as well as the transparent front mirror, being omitted, but the wiring diagram for the illumination of the chambers being shown; and Figure 4 is a transverse section solely through the casing of the apparatus in the plane C—D of Fig. 1.

On the drawings, 1 denotes the base of the apparatus, which supports the central portion 2 (Fig. 4) and the two lateral portions or wings 3 and 4. In the portion 2 are housed the advertising band 5, the driving mechanism therefor, and the switching mechanism for the lamps, and the lateral portions or wings are divided into show chambers 6—11 and 12—17. These chambers are intended for the reception of the articles to be exhibited; they are closed at the front by mirror panes of glass 18, as is also that part of the front of the central portion behind which a certain part of the advertising band is located. In order to render this part of the front mirror transparent electric lamps 19 are provided behind it in a separate casing 19 (Fig. 2) which is designed, and serves, as a reflector and is open at its front, and for the illumination of the show chambers electric lamps 20 are provided in them. Preferably these lamps themselves remain invisible also while they are switched on, and that they may be effected, for instance, in this way that in front of them just behind the panes 18, horizontal strips of milk-glass are provided which may, at the same time, be utilized for showing any advertisement relating to the respective article.

The show chambers 6—17 are preferably about triangular in horizontal section, as in Fig. 4, so that the interior of the chambers can be surveyed not only from the front, but also from a side.

21 is a motor which serves for driving the mechanism for moving the advertising band, as well as for operating the switching mechanism. A worm 22 affixed to the armature shaft of the motor meshes with a worm wheel 23 affixed to a shaft 24 to which is secured a crank disk 25 located on one side of said worm wheel, and a switching drum 26 located on the other side of the worm wheel, and lefthand from said drum also a pinion 27 is secured to said shaft. With the crank disk 25 is connected a rod 28 connected in turn at its other end with a toothed sector 29 supported on a pivot 30. The teeth of said sector mesh with a cog-wheel 31 which is coupled with a catch disk 32 and two pulleys 33, 34. The members 31, 32, 33 and 34 are secured to a common shaft 35, on which is loosely rotatable the upper drum 36 of the advertising band 5. This drum is provided with a pawl 37 which can engage a nose 38 of said catch disk 32. Over the pulleys 33 and 34 run wires or bands 39 and 40, each of which is provided, at its ends, with poises of equal weight; 41 and 43 are the poises of the wire or band 39, and 42 and 44 are the poises of the wire or band 40. The wires or bands with their poises are moved by the pulleys in the one and the other direction, as the case may be, and in order to provide for a good contact between the wires or bands and the pulleys these latter may have grooves in their circumferences.

The poises 41 and 42 are provided with turnable catches 45, each of which carries a counter-poise 46 at that end which extends counter to the band 5. This band is composed of a plurality of successive portions 47 (Fig. 2), the length of which corresponds to the length or height of that portion of the pane of the middle portion of the apparatus which constitutes a transparent mirror, as mentioned in a preceding part of this specification. The band portions 47 are connected with one another by means of horizontal rods 48, the laterally projecting ends of which are guided by and between guide bars 49. These bars form two oblong frames (Fig. 2), one lefthand from the band, the other righthand therefrom, each frame forming a front guide way and a rear guide way which are connected with one another at their upper and at their lower ends, so that the rods 48 can pass from the rear guide ways to the front ones, and vice versa, viz. first in and through the lower guide connections, and then in and through the upper ones. In the front guides the band portions 47 are vertically extended so as to be in the proper position in which the advertisements can be read, but in the rear guides or, more precisely, in the lower portions of these guides, the band portions form loops 47′ (Fig. 2) lying closely upon one another, also the rods 48 lying now upon one another, as shown.

It has already been said that the shaft 24 serves also for operating the switching mechanism for the lamps. The switching drum 26 affixed to the shaft 24 serves for switching on and off the lamps 19 provided for the illumination of the advertising band. The pinion 27 also affixed to the shaft 24 meshes with a cog-wheel 50 connected with another switching drum 51 which is in contact with as many sliding brushes 52, as there are show-chambers (6—17) or groups of such ones, each brush being conductively connected with one of said chambers or groups. Also the ratio of gearing between the pinion 27 and the cog-wheel 50 depends upon the number of the said chambers or groups, which are to be illuminated in a certain definite succession.

In the constructional form of the advertising apparatus shown by way of example there are 12 show-chambers (6—11 and 12—17), and the lamps of these chambers are so connected with the drum 51 that always two chambers are illuminated at the same time, the chambers forming, thus, six groups, which are to be illuminated one after the other, in this way, that after two chambers have been illuminated, now the advertising band is illuminated, thereafter further two chambers are illuminated, then again the advertising band, and so on. It appears from this succession that the ratio of transmission of the pinion 27 and the cog-wheel 50 must be 1 : 6, in the example in question.

The brushes 52 are conductively connected with the lamps 30 by means of wires 53—58, which are in this case so connected with the lamps that the show-chambers forming groups and being illuminated at the same time are the following: 6 and 17; 7 and 16; 8 and 15; 9 and 14; 10 and 13; and 11 and 12.

At the top of the apparatus is a clock 59, the dial of which can also be illuminated by electric lamps (not shown). Also these lamps may be switched on and off intermittently, either simultaneously with the lamps 19 or with the lamps 20 or in any other combination and succession.

The manner of operation of the apparatus is as follows:

When the motor has been switched on, the shaft 24 is driven by it whereby the switching drums 26 and 51 and the toothed sector 29 are moved, as described. When the sector and the poises 41 and 42 are in the initial position shown in Fig. 2, the sector is moved downwardly so that the pulleys 33 and 34, and with them the wires or bands 39 with their poises are moved in the direction indicated by the arrow in the top of Fig. 2. That is to say, the poises 41 and 42 are moved downwardly so that their catches 45—46 engage the rod 48' which is just below them, and take this rod down with them. The band portion suspended at this time from said rod 48' forms now a loop 47', i. e. the uppermost of all loops, and at the same time the lowermost loop is withdrawn, the band portion forming it is extended and drawn by the appertaining rod through the lowermost guide portions into the front portion of the guide frames, and also simultaneously therewith the band portion in front of the just mentioned extended portion arrives in front of the mirror portion of the pane of glass covering the central portion of the casing.

While the band is thus being moved, the lamps 19 are dark so that the movement of the band, or the exchange of the advertisements, cannot be seen from the outside of the apparatus. But one of the pairs of the show-chambers, for instance the pair 6—17, is illuminated during that time.

When the rod 48' has been moved down by the poises 41 and 42 and their catches 45—46 for such a length of way as corresponds to the length of the individual band portions, the sector 29 is drawn upwardly by the members 25 and 28 so that finally the catches arrive over the next rod 48'. In that moment in which the upward movement, the return movement, of the sector commences, the lamps 19 are switched on by the drum 26, whereas the lamps 20 of the show-chambers 6 and 17 are switched off. During that return movement the poises 41 and 42 with their catches have been lifted and the poises 43 and 44 have been lowered, but the catch disk 32 has turned idly, the pawl 37 having, thus, remained inactive, in consequence whereof the drum 36 and also the advertising band has not been moved in either direction. Only when the sector 29 is again moved downwardly, the band is moved by the catches 45—46 engaging the rod 48' just below them, when the operation described will be repeated, and so on.

As the catches 45—46 are turnably attached to the poises 41 and 42, they can give way when they arrive in their upper end position, that is to say, they get from below the rod 48' just present at the respective place to above that rod so that they can take it down with them when the poises are lowered by the means, and in the manner described.

When the next band portion has arrived in proper position behind the front mirror, the lamps 19 of another group of the show-chambers, for instance of the chambers 7 and 16, are switched on, and so the groups of the chambers follow one another in the predetermined succession, and between the illumination of two of these groups the band portion just behind the front mirror will be illuminated, as described. When six parts of the advertising band have been shown, the first group of the show-chambers is again illuminated, and so on, in the predetermined succession.

I claim:

1. An advertising apparatus, comprising, in combination with a casing and with mirrors which are transparent when being illuminated from behind, an advertising band and means for moving it in intervals, show-chambers provided in said casing; lamps for illuminating said band from behind and for illuminating the interior of said chambers; switching means so designed that the said band and the said chambers are illuminated alternately in such a succession that the band is illuminated after a number of chambers has been illuminated, and means for continuing and repeating this succession, said mirrors being arranged in front of a definite portion of the said band and in front of the said chambers.

2. An advertising apparatus, comprising, in combination with a casing and with mirrors which are transparent when being illuminated from behind, an advertising band and means for moving it in intervals, show-chambers provided in said casing and divided into groups; lamps for illuminating said band from behind and for illuminating the interior of said chambers; switching means so designed that the said band and the said chambers are illuminated alternately in such a succession that the band is illuminated after two chambers constituting a group have been illuminated, and means for continuing and repeating this succession, said mirrors being arranged in front of a definite portion of the said band and in front of the said chambers.

3. An advertising apparatus, comprising, in combination with a casing and mirrors which are transparent when being illuminated from behind, an advertising band and a motor for moving it; motion transmitting means inserted between said motor and said band and being so designed that the latter is moved in intervals; show-chambers provided in said casing; lamps for illuminating said band from behind and for illuminating the interior of said chambers; switching means, including switching drums, so designed that the said band and the said chambers are illuminated alternately in such a succession that the band is illuminated after a number of chambers has been illuminated; motion transmitting means inserted between said motor and said switching means, and means for continuing and repeating the succession in which the lamps are switched on and off, said mirrors being arranged in front of a definite portion of the said band and in front of the said chambers.

4. An advertising apparatus, comprising, in combination with a casing and with mirrors which are transparent when being illuminated from behind, an advertising band and a motor for moving it; motion transmitting means inserted between said motor and said band and being so designed that the latter is moved in intervals; show chambers provide in said casing; lamps for illuminating said band from behind and for illuminating the interior of said chambers; switching means, including switching drums, so designed that the said band and the said chambers are illuminated alternately in such a succession that the band is illuminated after a number of chambers has been illuminated; motion transmitting means inserted between said motor and said switching means and including a gearing comprising wheels, the ratio of transmission of which corresponds to the number of the groups of chambers, and means for continuing and repeating the succession in which the lamps are switched on and off, said mirrors being arranged in front of a definite portion of the said band and in front of the said chambers.

5. An advertising apparatus, comprising, in combination with a casing and with mirrors which are transparent when being illuminated from behind, an advertising band and means for moving it in intervals, these means comprising a toothed sector, means for moving it to and fro, pulleys turned by said sector alternately in the one and the other direction, pairs of poises suspended from said pulleys and being alternately lifted and lowered by them, a band-supporting drum arranged between said pulleys, and means for transmitting motion from these latter to said drum always only in one direction; show-chambers provided in said casing; lamps for illuminating said band from behind and for illuminating the interior of said chambers; switching means so designed that the said band and the said chambers are illuminated alternately in such a succession that the band is illuminated after a number of chambers has been illuminated, and means for continuing and repeating this succession, said mirrors being arranged in front of a definite portion of the said band and in front of the said chambers.

6. An advertising apparatus, comprising, in combination with a casing and with mirrors which are transparent when being illuminated from behind, an advertising band composed of successive individual pieces; a drum from which said band is suspended; rods connecting said pieces with one another and projecting laterally over them; means for moving the said band in intervals, these means comprising a toothed sector, means for moving it to and fro, pulleys turned by said sector alternately in the one and the other direction, pairs of poises suspended from said pulleys and being alternately lifted and lowered by them; catches attached to one poise of each pair of poises and being so located with respect to the projecting rod ends as to be able to take them down with them on their downward movement; show-chambers provided in said casing; lamps for illuminating said band from behind and for illuminating the interior of said chambers; switching means so designed that the said band and the said chambers are illuminated alternately in such a succession that the band is illuminated after a number of chambers has been illuminated, and means for continuing and repeating this succession, said mirrors being arranged in front of a definite portion of the said band and in front of the said chambers.

In testimony whereof I affix my signature.

WILHELM KUCZORRA.